Jan. 10, 1967  A. D. JANITSCH ETAL  3,297,141
CONVEYOR APPARATUS
Filed Dec. 28, 1964  4 Sheets-Sheet 4
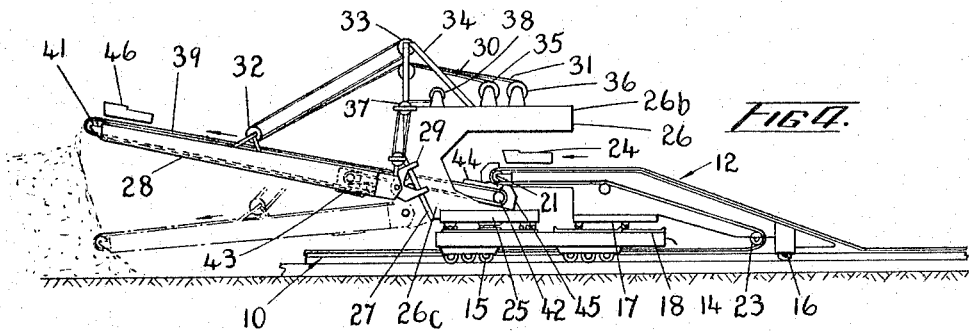
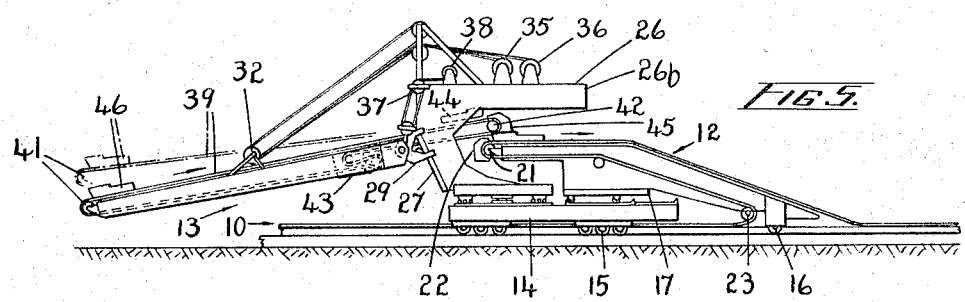
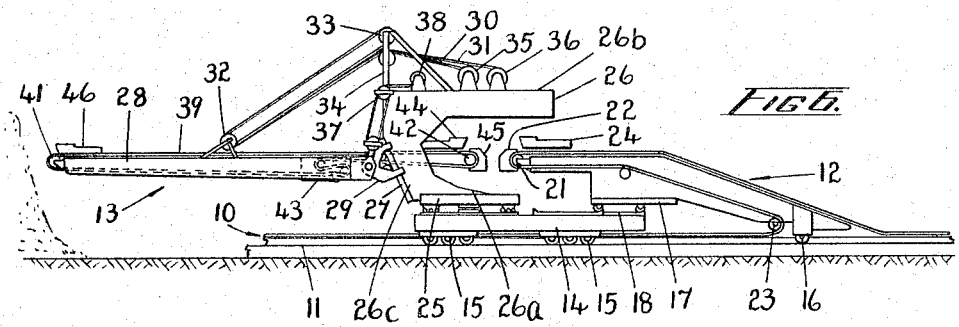
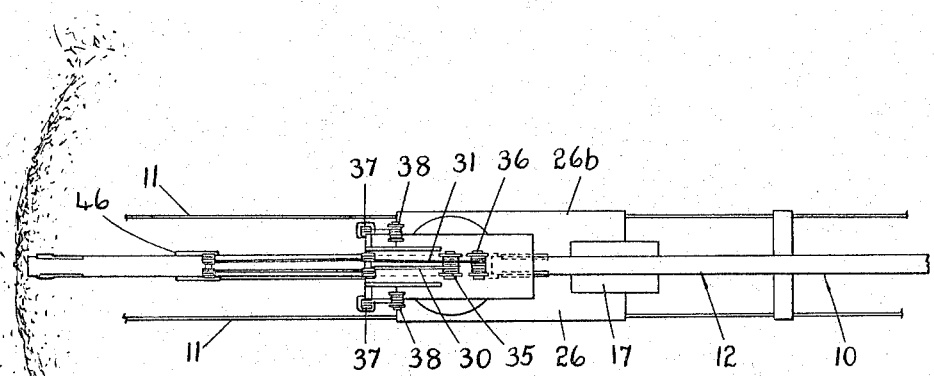
INVENTORS
ANTHONY D. JANITSCH
MATTHIEU SUYKENS
BY
*Maybee & Legris*
ATTORNEYS 3,297,141
CONVEYOR APPARATUS
Anthony D. Janitsch and Matthieu Suykens, Belleville, Ontario, Canada, assignors to Stephens-Adamson Mfg. Co. of Canada Limited, Belleville, Ontario, Canada, a corporation of Canada
Filed Dec. 28, 1964, Ser. No. 421,519
3 Claims. (Cl. 198—94)

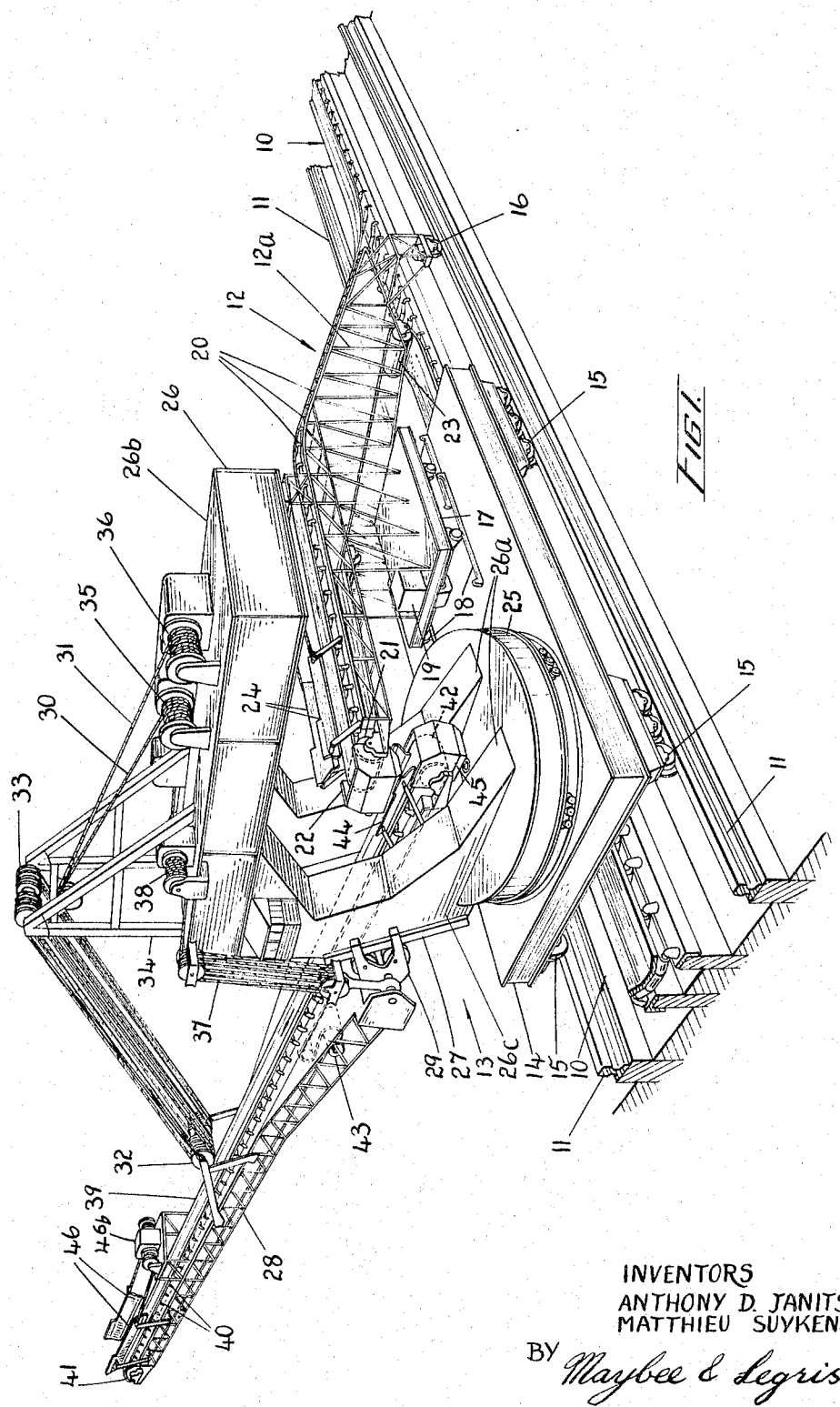

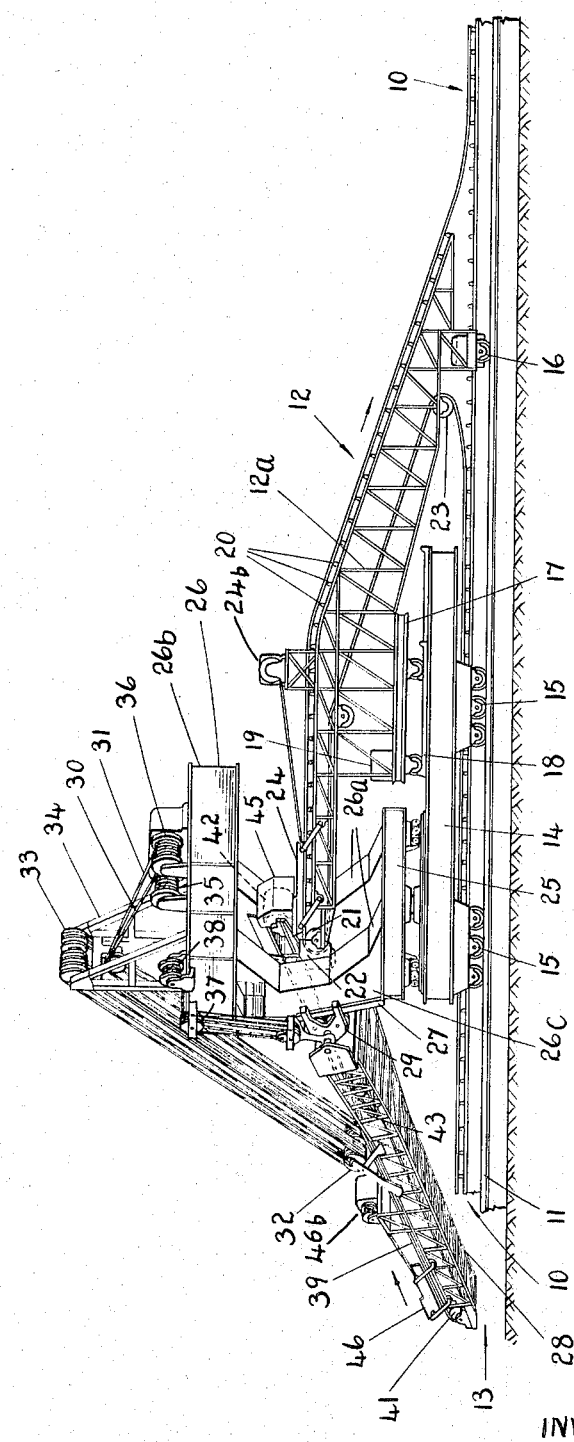

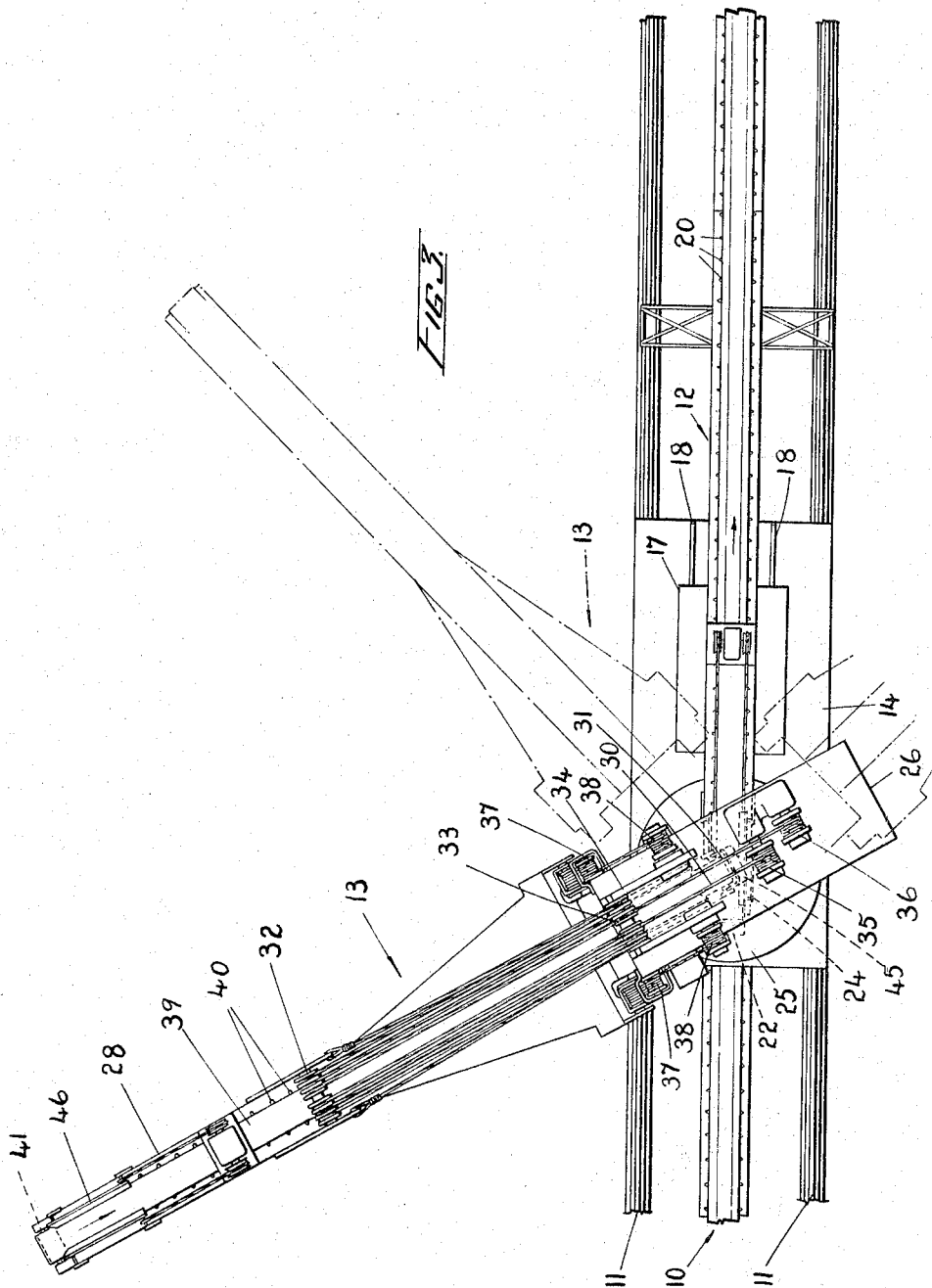

This invention relates to apparatus which can be used not only for conveying and stacking material when operating in a forward sense, but also for reclaiming stacked material and conveying it in a reverse sense.

It is a main object of the invention to provide an apparatus for conveying material in a forward sense from a first location and for stacking it at a second location, and also for reclaiming the stacked material at the second location and for conveying it in a reverse sense to the first location. Apparatus of this type is particularly useful in coal yards and in iron ore storage yards.

The foregoing and still further objects and advantages of the invention will become apparent from a study of the following specification, taken in conjunction with the accompanying drawings, in which like reference characters indicate corresponding parts throughout the several views, and in which:

FIG. 1 is a perspective view of an apparatus constructed in accordance with the invention and shown in stacking position;

FIG. 2 is a front elevational view of the apparatus, shown in reclaiming position;

FIG. 3 is a plan view of the apparatus, shown in reclaiming position, the chain-dotted lines indicating the two extreme conditions to which the boom conveyor may be slewed;

FIG. 4 is an elevational and somewhat diagrammatic view of the apparatus in stacking position, the boom conveyor being shown in two extreme conditions, namely in full lines where it is at a maximum high condition, and in chain-dotted lines where it is at a minimum low condition;

FIG. 5 is an elevational and somewhat diagrammatic view of the apparatus in reclaiming position, the boom conveyor being shown in two extreme conditions, namely in full lines where it is at a minimum low condition, and in chain-dotted lines where it is at a maximum high condition;

FIG. 6 is an elevational and somewhat diagrammatic view of the apparatus in a transitional position; and FIG. 7 is a plan and somewhat diagrammatic view of the apparatus in the transitional position of FIG. 6.

Referring to the drawings, the apparatus includes a large capacity belt conveyor generally indicated at 10, at each side of which and parallel to which are rails 11 which constitute a track. The belt conveyor is operable in a forward sense as well as in a reverse sense by an appropriate motor and control system, of known construction.

Supported by the rails 11 so as to extend over the belt conveyor 10 and arranged to travel over it from one end to the other are two major components, namely a tripper generally indicated at 12 and a stacker generally indicated at 13. The stacker includes a bed frame 14 having trucks 15 whereby the bed frame and the associated stacker are supported by the rails 11 above the belt conveyor 10 and are translatable to a multiplicity of positions along the entire length of the belt conveyor. A suitable motor and controls of known design (not shown but identified as "A" for convenience) are provided for translating the bed frame and the associated stacker.

Essentially a tripper is a mechanism which permits the discharge of material from a belt conveyor, anywhere along the length of the conveyor. Like the bed frame 14, the tripper 12 is supported by the rails 11. At its aft end the tripper is supported directly by the rails 11 through a truck 16, while adjacent its forward end the tripper is supported indirectly by the rails 11 through a truck 17 mounted for translation on a track 18 of the bed frame 14; the track 18 and the track constituted by the rails 11 are parallel. A reversible drive and control assembly, generally indicated at 19, is provided to shift and to position the tripper relative to the bed frame 14. Thus, the tripper 12 is translatable with the bed frame 14 and with the associated stacker 13 under the influence of the motor and control A, and the tripper also is shiftable relative to the bed frame 14 and to the associated stacker 13 under the guidance of the revesible drive and control assembly 19 and to an extent limited by the length of the track 18.

The tripper 12 includes a structural frame 12a supported on the trucks 16 and 17 and having an upper surface defined by a number of belt carriers 20. Adjacent the forward end of the tripper frame are an upper pulley 21 and a discharge chute 22, while near the aft end of the frame is a lower or belt-reversing pulley 23.

It will be appreciated that the tripper 12 elevates and deflects a cooperating portion of the belt conveyor 10 so that this cooperating portion overhangs the bed frame 14 and a portion of the belt conveyor underneath the bed frame. Thus, the belt conveyor will rise on the tripper, and if the belt conveyor is operating in a forward sense the material which it is conveying will be discharged adjacent the forward end of the tripper and into the discharge chute 22.

Adjacent the upper pulley 21 of the tripper, and above the belt which it supports, is a loading chute 24 which can be raised into and lowered from operating position by a motor and control assembly 24b. When the belt conveyor 10 is operating in a reverse sense, material may be loaded on it by being dropped into the loading chute 24, as will be described subsequently.

As was mentioned previously, the stacker generally indicated at 13 includes the bed frame 14 which supports a turntable 25 mounted for angular movement relative to the bed frame about a vertical axis; the orientation of the turntable relative to the bed frame is effected by a motor and suitable controls. Secured to the turntable is a C-shaped yoke generally indicated at 26 and having an arm 26a which is fast on the turntable 25 and having a cantilever 26b which provides a hoist platform as well as an electrical equipment housing and a counterweight support. On an intermediate portion 26c of the yoke is provided an inclined track 27.

The yoke 26 supports a boom conveyor 28 having guides 29 which slidably engage the track 27 of the yoke. More specifically, the boom conveyor is suspended by cables 30 and 31 through several sheaves 32 on the boom conveyor and through several sheaves 33 on an A-frame 34; the cables are operatively connected to a pair of hoists 35 and 36. An additional adjustable suspension for the boom conveyor is provided by a block and tackle generally indicated at 37 and by an associated hoist 38. By operating the hoist 38, the elevation of the guides 29 on the track 27 may be varied. Thus the tail end of the boom conveyor can be moved upwardly and forwardly by operating the hoist 38 in one sense, and it can be moved downwardly and rearwardly by operating the hoist 38 in a reverse sense. Likewise, the head end of the boom conveyor can be moved upwardly and downwardly under the influence of the hoists 35 and 36. It will be evident that since the boom conveyor is suspended at points intermediate its ends, any adjustment of the hoists 35 and 36 or of the hoist 38 will affect the elevation of both ends of the boom conveyor.

The boom conveyor 28 includes a conveyor belt 39 which is supported by a series of carrier rollers 40 and which extends between a head pulley 41 at one end and a tail pulley 42 at the other end; the belt 39 is driven by a conventional drive 43 coupled to a reversible motor and to appropriate controls. Slightly forward of the tail pulley 42 is a loading chute 44 which is adapted to cooperate with the discharge chute 22 of the tripper 12 when the apparatus is in stacking position; the loading chute 44 can be raised into and lowered from operating position by a motor and control assembly. Slightly aft of the tail pulley 42 is a discharge chute 45 which is adapted to cooperate with the loading chute 24 of the tripper when the apparatus is in reclaiming position, as will be explained subsequently. A loading chute 46 is provided slightly aft of the head pulley 41, for use when the apparatus is in reclaiming position; the loading chute 46 can be raised into and lowered from operating position by a motor and control assembly 46b.

Incidentally, the operating characteristics of the hoists 35, 36 and 38 under normal operation are so related that, when these three hoists are operated simultaneously, the tail pulley 42 will remain at a fixed position. Thus in any stacking operation or in any reclaiming operation, the attitude of the boom conveyor can be varied without creating any interference between the tail pulley end of the boom conveyor and the adjacent tripper 12.

When it is intended to convey material from a first location and to stack it at a second location, the parts of the apparatus are in the positions shown in FIGS. 1 and 4. The "first location" from which the material may be conveyed is a location within access of the belt conveyor 10; the "second location" where the material may be stacked is a location within the limits of travel and of slewing of the stacker 13. The stacker 13 and its associated tripper 12 can be translated along the entire length of the belt conveyor 10, and the free end of the boom conveyor can be slewed in an arc of some 270°, as indicated in FIG. 3. The belt conveyor 10 will transport the material in a forward sense until eventually the belt of the conveyor with the material on it is elevated and deflected by the tripper 12 and the material is discharged through the discharge chute 22 into the loading chute 44 at the tail end of the boom conveyor 28. The conveyor belt 39 of the boom conveyor carries the material forwardly until eventually it approaches the head end of the boom conveyor and is discharged therefrom at the "second location." The precise location where the material is discharged obviously depends on the position where the boom conveyor has been slewed and also on the position to which it has been elevated by the hoists 35, 36 and 38.

It will be noted that when the apparatus is used for stacking material, the tail end of the boom conveyor is positioned as shown in FIGS. 1 and 4, that is, so that the tail end is underneath the overhanging portion of the belt conveyor or, to be more precise, in a position where the loading chute 44 of the boom conveyor is underneath the discharge chute 22 of the tripper.

Whenever it is desired to reclaim material from a second location and to convey it in a reverse sense to the first location, the relative positions of the tail end of the boom conveyor and of the overhanging portion of the belt conveyor at the tripper have to be reversed so that the discharge chute 45 of the boom conveyor becomes positioned above the loading chute 24 of the tripper. Incidentally, in this context the "second position" from which the material may be reclaimed is any position within access of the loading chute 46 of the boom conveyor as the boom conveyor is slewed on its turntable and as it is translated on the rails 11; the "first position" to which the reclaimed material may be conveyed is of course any position adjacent the belt conveyor.

In order to arrange the apparatus in reclaiming position, the tail end of the boom conveyor firstly is so positioned by appropriately operating the hoists 35, 36 and 38 that the discharge chute 22 of the tripper 12 has sufficient clearance relative to the loading chute 44 of the boom conveyor. Then, the tripper is shifted on the rails 18 relative to the bed frame 14, as shown in FIGS. 6 and 7, thus to be in retracted condition; in this condition, the tripper and the tail end of the boom conveyor clear each other as is illustrated in FIG. 6. The tail end of the boom conveyor 13 then is raised about its suspension point provided by sheaves 32, by winding the hoist 38; thus the tail end of the boom conveyor is raised so that it clears the head end of the tripper. Finally, the tripper is shifted back to the forward condition, and the parts now assume the positions shown in FIGS. 2, 3 and 5.

To reclaim the stacked material, the belt conveyor 10 as well as the boom conveyor 28 are operated in a reverse sense. The free end of the boom conveyor is inserted into the stacked material so that the material falls into the loading chute 46, or alternatively, other suitable means are provided to direct the stacked material into the chute 46. The boom conveyor then conveys the material towards its tail end, and it is is discharged through the discharge chute 45 into the tripper loading chute 24 by gravity. The material is conveyed down the tripper incline toward the first location, whence it is discharged in a known manner.

It will be understood that the form of the invention herewith shown and described is a preferred example, and that various modifications can be carried out without departing from the spirit of the invention or the scope of the appended claims.

What we claim as our invention is:

1. Apparatus for conveying material in a forward sense from a first location and for stacking it at a second location, and also for reclaiming stacked material at the second location and for conveying it in a reverse sense to the first location, comprising a belt conveyor extending from the first location and which is operable in a forward sense as well as in a reverse sense, a tripper for the belt conveyor and means mounting the same for translation along a path parallel to the belt conveyor to a multiplicity of positions intermediate the first and the second locations, the tripper having a fixed elevated end which elevates and deflects a cooperating portion of the belt conveyor so that it overhangs an adjacent portion of the belt conveyor at a predetermined level, a boom conveyor having a tail end adjacent and cooperatively associated with the overhanging portion of the belt conveyor and also having a head end, means mounting said boom conveyor for movement along the belt conveyor and for vertical swinging movement to selectively position said head end at the second location at different elevations, the boom conveyor being operable in a forward sense to convey material from the tail end and to discharge material at the second location from the head end, and also being operable in a reverse sense to load material at the head end from the second location and to convey it towards the tail end, means supporting the tail end of said boom conveyor for selective up and down movement whereby it is positionable at either of two vertical positions relatively to the belt conveyor at the tripper, namely at a lower, stacking position where the tail end is underneath the overhanging portion of the belt conveyor thus to receive material from the belt conveyor when the belt conveyor and the boom conveyor are operating in a forward sense, and at an upper, reclaiming position where the tail end is above the overhanging portion of the belt conveyor thus to discharge material on the belt conveyor when the belt conveyor and the boom conveyor are operating in a reverse sense.

2. Apparatus for conveying material in a forward sense from a first location and for stacking it at a second location, and also for reclaiming stacked material at the second location and for conveying it in a reverse sense to the first location, comprising a belt conveyor extending from the first location and which is operable in a forward sense as well as in a reverse sense, a rail at each side of the belt conveyor and disposed parallel to it, the said rails constituting a track, a bed frame supported by the track above the belt conveyor and translatable to a multiplicity of positions intermediate the first and the second locations, a track on the bed frame and arranged parallel to the first mentioned track, a tripper for the belt conveyor supported by the bed frame track and translatable with the bed frame and being mounted for shifting movement to the bed frame between a forward condition and a retracted condition, the tripper having an elevated end at a predetermined level which elevates and deflects a cooperating portion of the belt conveyor so that it overhangs the bed frame and a portion of the belt conveyor underneath the bed frame, a boom conveyor mounted on the bed frame and having a tail end adjacent and cooperatively associated with the overhanging portion of the belt conveyor and also having a head end positionable adjacent the second location, means mounting said boom conveyor on said bed frame for vertical swinging movement whereby to selectively position said head end at different elevations, the boom conveyor being operable in a forward sense to convey material from the tail end and to discharge material at the second location from the head end, and also being operable in a reverse sense to load material at the head end from the second location and to convey it towards the tail end, means mounting the tail end for up and down movement on said frame whereby it is selectively positionable to two positions relatively to the belt conveyor at the tripper, namely to a stacking position where the tail end is underneath the overhanging portion of the belt conveyor provided the tripper is in forward condition thus to receive material from the belt conveyor when the belt conveyor and the boom conveyor are operating in a forward sense, and to a reclaiming position where the tail end is above the overhanging portion of the belt conveyor provided the tripper is in forward condition thus to discharge material on the belt conveyor when the belt conveyor and the boom conveyor are operating in a reverse sense, the tripper being shiftable to retracted condition as aforementioned to provide clearance for the tail end of the boom conveyor thus to permit its movement from one position to the other position.

3. Apparatus for conveying material in a forward sense from a first location and for stacking it at a second location, and also for reclaiming stacked material at the second location and for conveying it in a reverse sense to the first location, comprising a belt conveyor extending from the first location and which is operable in a forward sense as well as in a reverse sense, a rail at each side of the belt conveyor and disposed parallel to it, the said rails constituting a track, a bed frame supported by the track above the belt conveyor and translatable to a multiplicity of positions intermediate the first and the second locations, a track on the bed frame and arranged parallel to the first mentioned track, a tripper for the belt conveyor supported by the bed frame track and translatable with the bed frame and also shiftable relative to the bed frame between a forward condition and a retracted condition, the tripper having an elevated end at a predetermined level which elevates and deflects a cooperating portion of the belt conveyor so that it overhangs the bed frame and a portion of the belt conveyor underneath the bed frame, a boom conveyor having a tail end adjacent and cooperatively associated with the overhanging portion of the belt conveyor and also having a head end positionable adjacent the second location, means mounting said boom conveyor on said bed frame for vertical swinging movement whereby to selectively position said head end at different elevations, the boom conveyor being operable in a forward sense to convey material from the tail end and to discharge material at the second location from the head end, and also being operable in a reverse sense to load material at the head end from the second location and to convey it towards the tail end, a turntable supported by the bed frame for angular movement about a vertical axis, adjustable mounting means on the turntable for the boom conveyor, the boom conveyor being mounted on said turntable for vertical swinging movement whereby its head end is selectively positionable either to a stacking position or a reclaiming position, and means mounting its tail end for up and down movement on said turntable to a position where its tail end is underneath the overhanging portion of the main portion of the belt conveyor provided the tripper is in forward condition thus to receive material from the belt conveyor when the belt conveyor and the boom conveyor are operating in a forward sense, or to a reclaiming position where the tail end is above the overhanging portion of the belt conveyor provided the tripper is in forward condition thus to discharge material on the belt conveyor when the belt conveyor and the boom conveyor are operating in a reverse sense, the tripper being shiftable to retracted condition as aforementioned to provide clearance for the tail end of the boom conveyor thus to permit its movement from one position to the other position.

References Cited by the Examiner

UNITED STATES PATENTS 2,734,622   2/1956   Everhart _____ 198—186

FOREIGN PATENTS 1,327,791   4/1963   France.
1,187,998   2/1965   Germany.

EVON C. BLUNK, *Primary Examiner.*

HUGO O. SCHULZ, *Examiner.*

R. E. AEGERTER, R. M. WALKER,
*Assistant Examiners.*